(12) United States Patent
Brown et al.

(10) Patent No.: US 8,416,493 B1
(45) Date of Patent: Apr. 9, 2013

(54) OPTICAL SYSTEMS

(75) Inventors: Wade W. Brown, Blaine, MN (US);
Jamie D. Rhead, Plymouth, MN (US);
Nicholas Vitalbo, Norton, OH (US);
John R. Hoffman, Eden Prairie, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 571 days.

(21) Appl. No.: 12/751,527

(22) Filed: Mar. 31, 2010

(51) Int. Cl.
*G02B 23/00* (2006.01)
(52) U.S. Cl. .......................... 359/399; 359/629; 359/630
(58) Field of Classification Search .................. 359/399, 359/629–631, 633
See application file for complete search history.

(56) References Cited

U.S. PATENT DOCUMENTS

| | | | | |
|---|---|---|---|---|
| 3,379,827 A | * | 4/1968 | Rossoff | 348/55 |
| 5,579,165 A | * | 11/1996 | Michel et al. | 359/630 |
| 5,892,617 A | * | 4/1999 | Wallace | 359/353 |
| 7,719,749 B1 | * | 5/2010 | Minor et al. | 359/267 |

* cited by examiner

*Primary Examiner* — Frank Font
(74) *Attorney, Agent, or Firm* — Hamre, Schumann, Mueller & Larson, P.C.

(57) ABSTRACT

Optical systems are described that use one or more lasers to project images onto a screen or projection surface. The optical systems can be direct view optical systems or vision projection optical systems. The described systems reduce costs and power consumption compared to the use of optical systems that use LCD screens. In addition, the described optical systems permit the image to be displayed anywhere on the screen, which in turn allows the screen to have improved light transmission for enhanced target identification in the case of gun/weapon sights and other devices that are used for target recognition.

16 Claims, 4 Drawing Sheets

OPTICAL SYSTEMS

FIELD

This disclosure relates to optical systems such as direct view optical systems and vision projection optical systems.

BACKGROUND

Target viewing devices such as gun/weapon sights, spotter scopes, telescopes, microscopes, monoculars, binoculars and the like are example forms of direct view optical devices. In devices such as gun/weapon sights, reticles are projected onto LCD screens incorporated into the gun/weapon sight. The LCD screens are typically full color display devices, and in most cases the projected reticle is monochromatic. So only a small portion of the capabilities of the LCD screens are used. In addition, LCD screens are expensive, generate a significant amount of heat, and consume a significant amount of power.

Moreover, LCD screens used in gun/weapon sights generally cover the entire field of view or project onto screens that cover the entire viewing area. A screen that obscures the entire field of view reduces the light transmission across the entire field of view. In low light vision applications, small reductions in visible light transmission significantly reduce the ability to identify targets through the sight.

SUMMARY

Optical systems are described that use one or more lasers to project images onto a screen or projection surface. The optical systems can be direct view optical systems or vision projection optical systems. The described systems reduce costs and power consumption compared to the use of optical systems that use LCD screens. In addition, the described optical systems permit the image to be displayed anywhere on the screen, which in turn allows the screen to have improved light transmission for enhanced target identification in the case of gun/weapon sights and other devices that are used for target recognition.

The concepts described herein can be used on gun/weapon sights, spotter scopes, telescopes, microscopes, monoculars, binoculars, cameras, virtual reality glasses, and other devices. A direct view optical system is one where a viewer is able to directly see light gathered by the system, such as telescopes, monoculars, microscopes, binoculars, gun/weapon sights and the like. A vision projection optical system is one where a viewer is able to view an image that is projected onto a screen or projection surface, where the screen can also be partially transparent to allow the viewer to see through the screen to the background to directly see light gathered by the system.

In one embodiment, a direct view optical system is provided that includes a viewing end, a light input aperture, a first laser that is configured to output a first laser beam, a steerable light reflecting device positioned to reflect the first laser beam output by the first laser, a first optical shutter device disposed in a light path between the first laser and the steerable light reflecting device, and a screen that includes a portion that is at least partially transparent to allow viewing of light that enters via the light input aperture. The screen also includes a portion that is at least partially reflective or fluorescent onto which an image, for example a reticle, is projected. The first laser beam output by the first laser can be a visible beam or a non-visible beam. When the beam is non-visible, the beam induces fluorescence on the screen.

In another embodiment, an optical system is provided that includes a first laser that is configured to output a first visible or non-visible laser beam, a steerable light reflecting device positioned to reflect the first laser beam output by the first laser, a first optical shutter device disposed in a light path between the first laser and the steerable light reflecting device, and a projection surface having a viewing side that is positioned to receive the first laser beam reflected by the steerable light reflecting device. The projection surface is at least partially reflective or fluorescent, and in some embodiments the projection surface may also be partially transparent.

DRAWINGS

DETAILED DESCRIPTION

Figure 1:
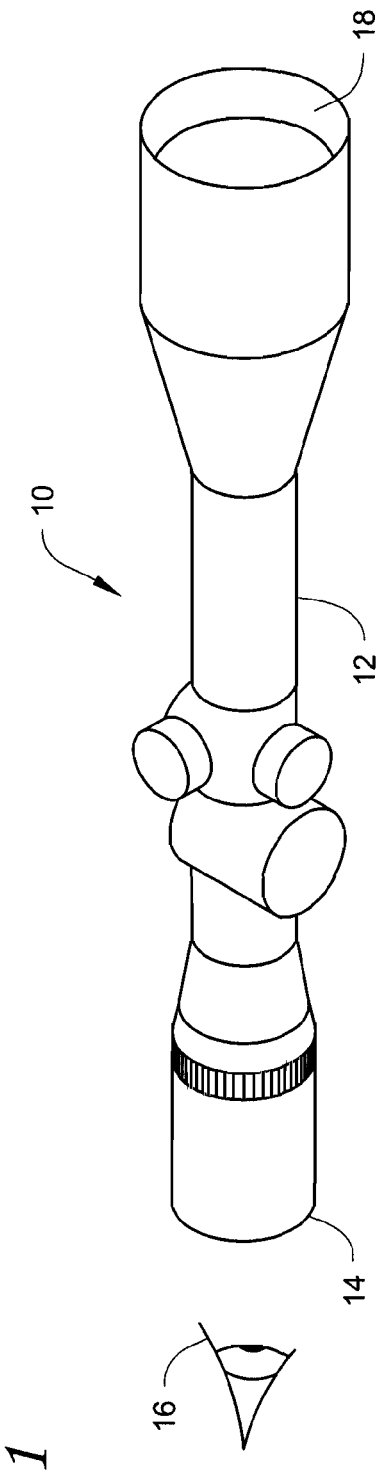
FIG. 1 depicts a gun sight that can incorporate the direct view optical concepts described herein.

With reference to FIG. 1, for purposes of describing the inventive concepts, a gun sight 10 is illustrated that can incorporate the direct view optical concepts described herein. It is to be realized that the concepts described herein can be employed on or with other types of optical devices, such as spotter scopes, telescopes, microscopes, monoculars, binoculars, cameras, virtual reality glasses, and other devices.

The gun sight 10 includes a housing 12 having a viewing end or aperture 14 at one end through which a user 16 looks into the gun sight, and a light input aperture 18 at the opposite end through which light from a target to be viewed enters the gun sight. On or within the housing 12 are various additional optical components discussed below with respect to FIGS. 2 and 3.

Figure 2:
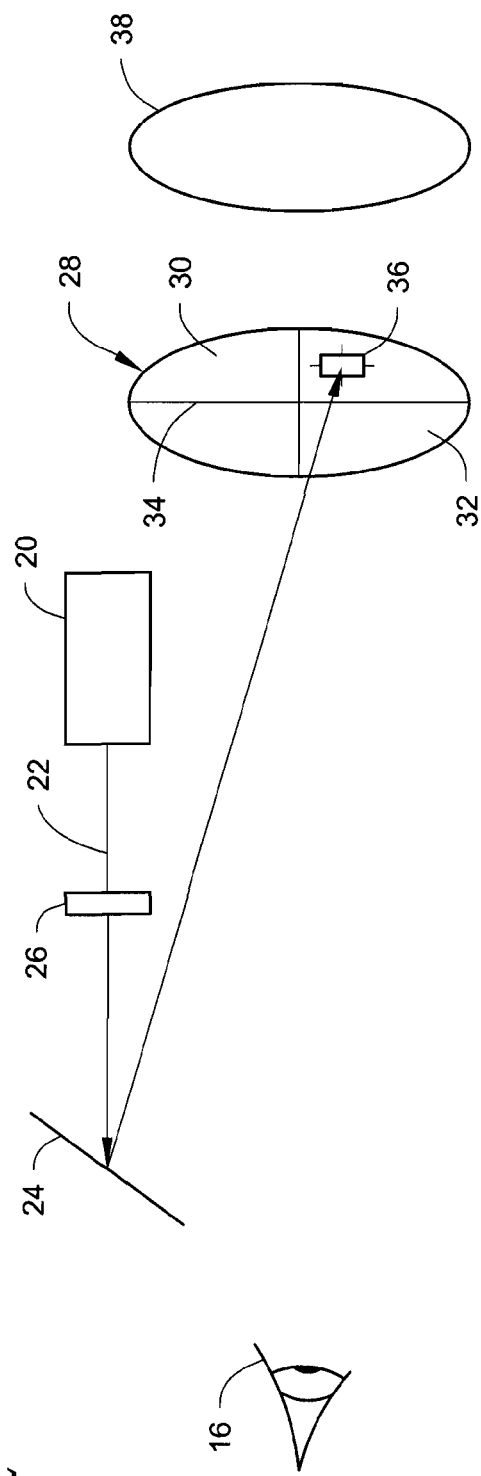
FIG. 2 is a schematic illustration of one embodiment of a direct view optical system described herein.

With reference to FIG. 2, the gun sight 10 includes a laser 20 that is configured to output a visible or a non-visible fluorescence-inducing laser beam 22. As used herein, the terms visible and non-visible mean visibility or non-visibility by the human eye. The laser 20 can be any kind of laser that outputs a visible laser beam, including but not limited to an yttrium aluminum garnet (YAG) laser that outputs a green light laser beam, for example at 503 nm. Alternatively, the laser 20 can be of a type that outputs a non-visible beam which produces fluorescence on a surface 32 that is visible to the human eye.

A steerable light reflecting device 24 is positioned to reflect the laser beam 22 output by the laser. The light reflecting device 24 can be, for example, a mirror that is MEMS actuated in two dimensions to be able to steer the reflected beam.

An optical shutter device 26 is disposed in the light path between the laser 20 and the steerable light reflecting device 24 to turn the beam 22 on and off. The shutter device 26 is used to determine the image(s), for example a reticle, alphanumerics, range to target, wind information, etc., that are ultimately projected onto the display. The shutter device 26 can be any device suitable for creating the desired image(s), for example an LCD shutter. In addition, the shutter device 26 can be disposed at other locations in the light path.

A screen 28 is disposed within the housing 12 onto which the reflected beam from the reflecting device 24 is projected. The screen 28 includes a portion 30 that is at least partially transparent to allow direct viewing of light that enters via the light input aperture 18. The transparent portion 30 facilitates target identification by maximizing the amount of direct light reaching the screen 28 for viewing by the viewer. The screen 28 also includes a portion 32 that is at least partially reflective or fluorescent. It is the portion 32 that receives the beam from the reflecting device 24 to allow viewing of the projected image by the user 16. The portion 32 can be made partially reflective or fluorescent by a coating that is applied to the screen 28.

In the illustrated embodiment, the transparent portion 30 comprises the upper half of the screen 28 while the portion 32 comprises the lower half of the screen. However, the portions 30, 32 can occupy any desired proportions, equal or unequal, of the screen 28, for example the left and right halves of the screen 28, ¼ and ¾, etc.

As shown in FIG. 2, the screen 28 includes a primary reticle 34 comprising crosshairs etched into the screen 28. The optical system allows a new reticle 36 or aim point to be projected onto the portion 32 of the screen 28 by the laser 20. The vertical and left and right positioning of the new reticle 36 can be altered by the steerable reflecting device 24 simply by steering the reflecting device 24 to change its angle.

The location of the new reticle 36 on the screen 28 can be the result of a new firing solution calculated based on various factors by a separate computing device (not illustrated). Once the user identifies the target through the transparent portion 30, the user moves the gun sight until the new reticle 36 is on the target, thereby increasing the chances of an accurate shot.

To prevent laser light from escaping from the gun sight, a filter 38 is provided between the screen 28 and the light input aperture 18. The filter 38 can be, for example, a 503 nm notch filter.

Figure 3:
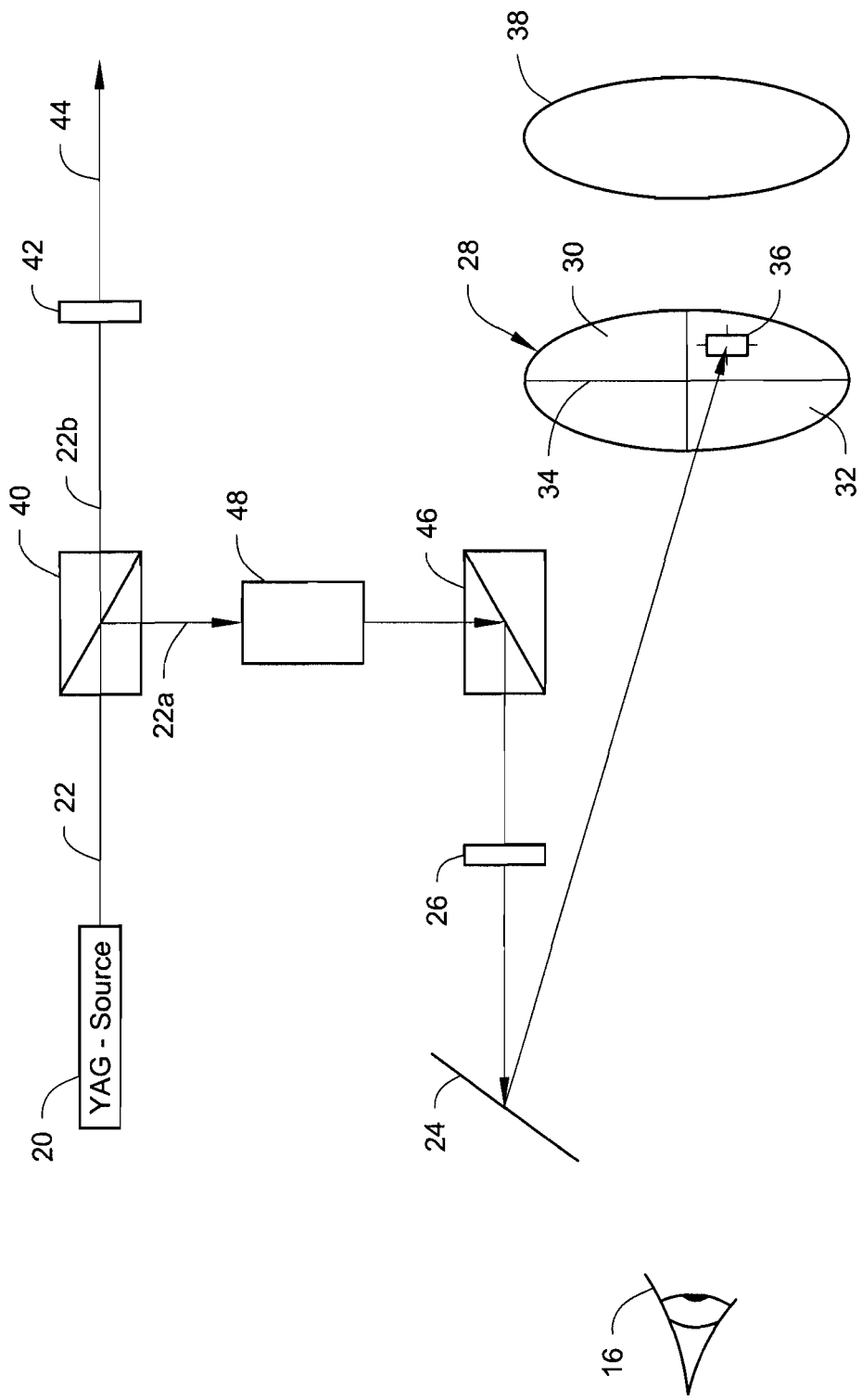
FIG. 3 is a schematic illustration of another embodiment of a direct view optical system that also includes a laser range finder.

FIG. 3 is a schematic illustration of another embodiment of a direct view optical system that is similar in construction to the system in FIG. 2, but which also includes a laser range finder mechanism for use in determining range to target. The laser range finder mechanism includes a beam splitter 40 that receives the laser beam 22 and splits the beam 22 into a first laser beam 22a and a second laser beam 22b. An optical shutter device 42 is disposed between the beam splitter 40 and a light output to receive the second laser beam 22b and output a range finding beam 44 for use in determining range to target.

In addition, a reflector 46 receives the first beam 22a and reflects the first laser beam through the shutter 26 and toward the steerable light reflecting device 24. A frequency doubler 48 is provided in the light path between the beam splitter 40 and the reflector 46 to increase the frequency of the beam 22a.

Figure 4:
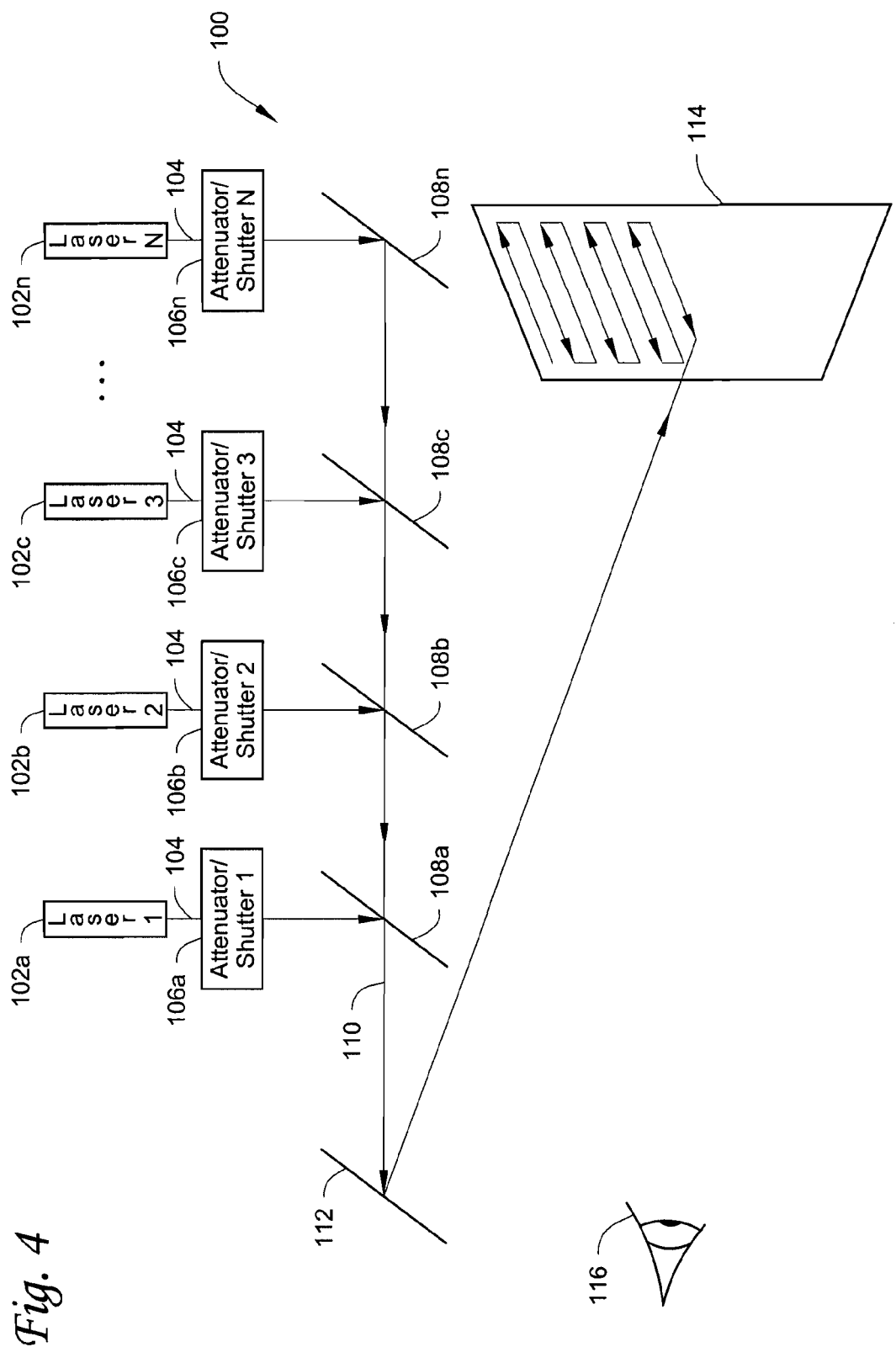
FIG. 4 is a schematic illustration of an embodiment of an optical system that employs multiple lasers projecting an image onto a projection surface.

With reference to FIG. 4, an optical system 100 is illustrated that employs multiple lasers projecting an image onto a projection surface. The optical system 100 can function as a vision projection optical system as well as a direct view optical system.

The system 100 includes a plurality of lasers 102a, b, c . . . n, each of which outputs a visible or non-visible fluorescence-inducing laser beam 104. Some of the lasers 102a, b, c . . . n might output beams of the same color. This would increase the total intensity of that color for the display. Some of the lasers might output different colors in order to encode color and intensity for the display. For example, the laser 102a can output a green laser beam, the laser 102b can output a blue laser beam, the laser 102c can output a red laser beam, etc. The laser beams 104 are each passed through optical shutter devices 106a, b, c . . . n, for example opto-electronic attenuators/shutters, disposed in the light paths of the laser beams 104, and are then combined in beam combiners 108a, b, c . . . n to form a combined beam 110. This encodes the color and intensity for the resulting projected display.

A steerable light reflecting device 112 is positioned to reflect the combined beam 110. The light reflecting device 112 can be, for example, a mirror that is MEMS actuated in two dimensions to be able to steer the beam. The steering can be performed as a 2D raster pattern or in any general fashion.

Co-alignment of the beams 104 from the lasers 102a, b, c . . . n may require a calibration procedure in which the alignment of the individual beam combiners 108a, b, c . . . n is adjusted. With the reflecting device 112 in a fixed position, the beam combiners 108a, b, c . . . n can be adjusted to move the projected laser spots to the same position on the projection surface.

The beam reflected by the reflecting device 112 is projected onto a projection surface 114 for viewing by a viewer 116. The projection surface 114 can be totally or partially reflective or fluorescent. An example of a suitable projection surface 114 includes, but is not limited to, a flat white surface. The projection surface 114 can also be partially transparent to allow the viewer 116 to see through the projection surface 114 to the background when the system is turned off.

Figure 5:
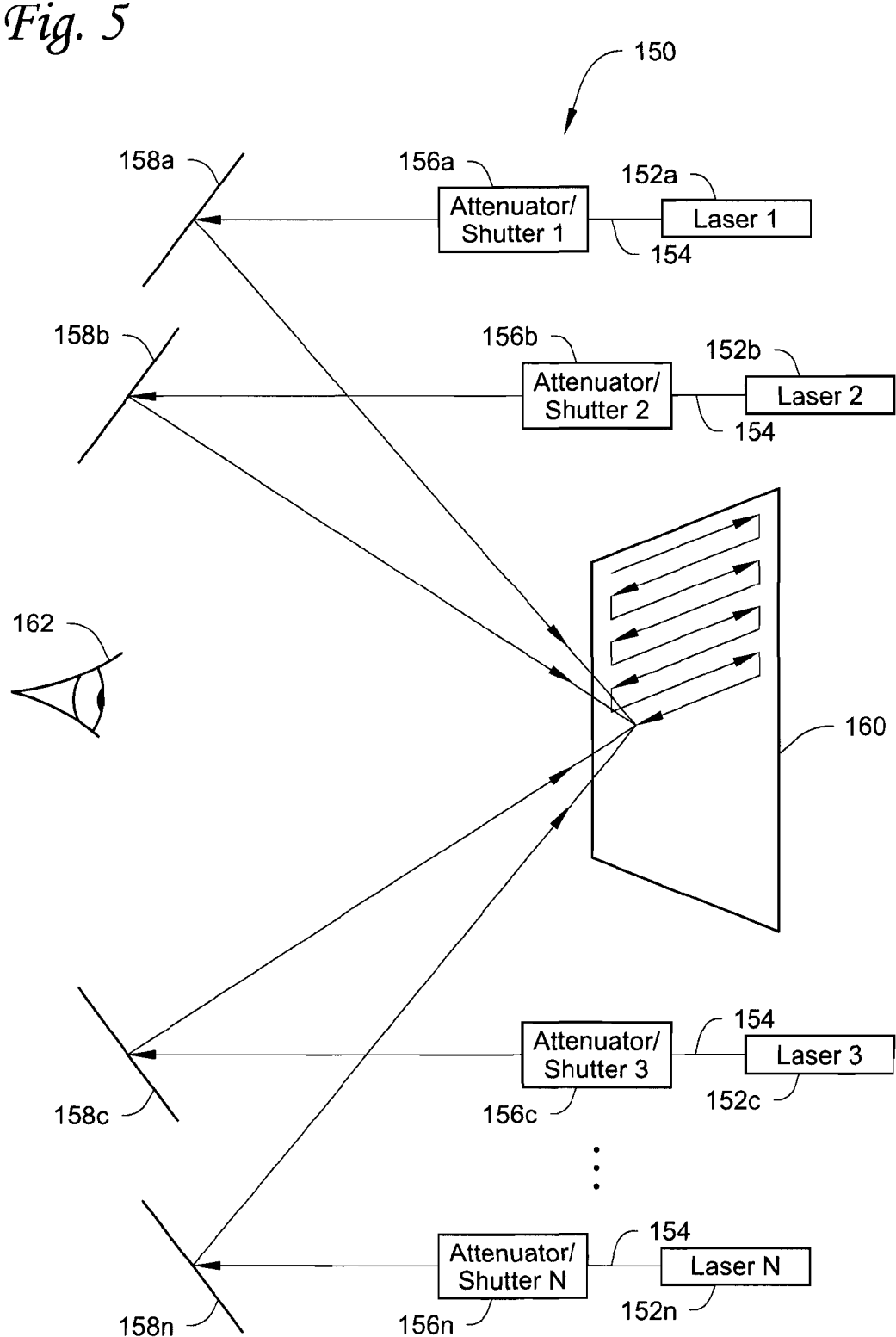
FIG. 5 is a schematic illustration of another embodiment of an optical system that employs multiple lasers projecting an image onto a projection surface.

FIG. 5 also illustrates an optical system 150 that employs multiple lasers projecting an image onto a projection surface, and which can function as a vision projection optical system as well as a direct view optical system similar to the optical system 100 illustrated in FIG. 4.

The system 150 includes a plurality of lasers 152a, b, c . . . n each of which outputs a visible or fluorescence-inducing laser beam. Some of the lasers might output beams of the same color. This would increase the total intensity of that color at a particular display location, or in this configuration of the system 150, could allow for display of the same color at multiple locations simultaneously. Some of the lasers might output different colors in order to encode color and intensity for the display. For example, the laser 152a can output a green laser beam, the laser 152b can output a blue laser beam, the laser 152c can output a red laser beam, etc. The laser beams 154 are each passed through optical shutter devices 156a, b, c . . . n, for example opto-electronic attenuators/shutters, disposed in the light paths of the laser beams 154. This encodes the color and intensity for the resulting projected display.

The individual beams are then directed to steerable light reflecting devices 158a, b, c . . . n positioned to reflect the beams. The light reflecting devices 158a, b, c . . . n can be, for example, mirrors that are MEMS actuated in two dimensions to be able to steer the beams. The steering can be performed as a 2D raster pattern or in any general fashion.

The beams reflected by the reflecting devices 158a, b, c . . . n are then projected onto a projection surface 160 for viewing by a viewer 162. The projection surface 160 can be totally or partially reflective or fluorescent. An example of a suitable projection surface 160 includes, but is not limited to, a flat white surface. The projection surface 160 can also be partially transparent to allow the viewer 162 to see through the projection surface 160 to the background when the system is turned off.

Co-alignment of the laser spots from the lasers 152a, b, c . . . n may require a calibration procedure in which offset angles from the individual steerable reflecting devices 158a, b, c . . . n would be determined such that the spots from the lasers 152a, b, c . . . n are made coincident at multiple positions on the display surface.

With respect to the embodiments in FIGS. 2-5, in certain instances it may be possible to substitute a light emitting diode(s) and lens combination for the laser(s).

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A direct view optical system, comprising:
   a viewing end;
   a light input aperture;
   a first laser that is configured to output a first laser beam;
   a steerable light reflecting device positioned to reflect the first laser beam output by the first laser;
   a first optical shutter device disposed in a light path between the first laser and the steerable light reflecting device; and
   a screen that includes a first portion that is at least partially transparent to allow viewing of light that enters via the light input aperture, and the screen also includes a second portion that is at least partially reflective or fluorescent.

2. The direct view optical system of claim 1, wherein the steerable light reflecting device comprises a mirror.

3. The direct view optical system of claim 1, wherein the first optical shutter device comprises a shutter or an attenuator.

4. The direct view optical system of claim 1, wherein the second portion of the screen is fluorescent and has a fluorescent coating.

5. The direct view optical system of claim 1, wherein the direct view optical system comprises a gun sight, a spotter scope, a telescope, a microscope, a monocular, binoculars, virtual reality glasses, or a camera.

6. The direct view optical system of claim 1, further comprising a laser range finder that includes a beam splitter that is positioned to split the first laser beam output by the first laser into a first laser beam and a second laser beam, a second optical shutter device disposed to receive the second laser beam and output a range finding beam, and a reflector that reflects the first laser beam toward the steerable light reflecting device, the first optical shutter device being disposed between the steerable light reflecting device and the reflector.

7. The direct view optical system of claim 1, further comprising a second laser that is configured to output a second laser beam of the same or different color than the first laser beam of the first laser, and an optical shutter device disposed in a light path of the second laser beam.

8. The direct view optical system of claim 7, further comprising a beam combiner that combines the first laser beam and the second laser beam into a combined beam, and the steerable light reflecting device is positioned to receive the combined beam.

9. The direct view optical system of claim 7, further comprising a second steerable light reflecting device positioned to reflect the second laser beam output by the second laser.

10. The direct view optical system of claim 1, wherein the first laser beam is a visible laser beam or a non-visible fluorescence-inducing laser beam.

11. An optical system, comprising:
    a first laser that is configured to output a first laser beam;
    a steerable light reflecting device positioned to reflect the first laser beam output by the first laser;
    a first optical shutter device disposed in a light path between the first laser and the steerable light reflecting device; and
    a projection surface having a viewing side that is positioned to receive the first laser beam reflected by the steerable light reflecting device, and the projection surface is at least partially reflective or fluorescent.

12. The optical system of claim 11, further comprising a plurality of additional lasers each of which is configured to output a laser beam, the laser beams of the first laser and the additional lasers are of differing or the same colors as one another, and optical shutter devices are disposed in the light paths of the laser beams of the additional lasers.

13. The optical system of claim 12, further comprising a plurality of beam combiners that combine the first laser beam and the laser beams of the additional lasers into a combined beam, and the steerable light reflecting device is positioned to receive the combined beam.

14. The optical system of claim 12, further comprising additional steerable light reflecting devices positioned to reflect the laser beams output by the additional lasers.

15. The optical system of claim 12, wherein the projection surface is at least partially transparent.

16. The optical system of claim 11, wherein the first laser beam is a visible laser beam or a non-visible fluorescence-inducing laser beam.

* * * * *